Dec. 25, 1956 H. WINOGRAD 2,775,733
SYSTEM FOR OBTAINING A PREDETERMINED DIVISION OF LOAD
BETWEEN A PLURALITY OF PARALLELED CONVERTERS
Filed Dec. 21, 1953 3 Sheets-Sheet 3

Inventor
Harold Winograd
by Joseph E. Kerwin
Attorney

United States Patent Office 2,775,733
Patented Dec. 25, 1956

2,775,733

SYSTEM FOR OBTAINING A PREDETERMINED DIVISION OF LOAD BETWEEN A PLURALITY OF PARALLELED CONVERTERS

Harold Winograd, Milwaukee, Wis., assignor to Allis-Chalmers Manufacturing Company, Milwaukee, Wis.

Application December 21, 1953, Serial No. 399,208

12 Claims. (Cl. 321—27)

This invention relates in general to electric valve conversion systems having a plurality of conversion units connected in parallel to a load circuit and more particularly to an improved system for obtaining a predetermined load division between the parallel connected units.

Electric valve conversion units having a plurality of separate valves for transmitting energy from an A. C. supply circuit to a load circuit are well known in the art. In these units the amount of power transmitted by each unit is controlled by suitable regulating means which in most systems operates to vary the phase of the grid excitation in accordance with variations in an electric quantity of the output circuit of the unit. When the output circuits of rectifier units of this type are connected in parallel to a D. C. bus, or load circuit, certain of the units may assume more than their proportionate share of load, resulting in poorer operating performance. In order to insure a division of load between the parallel connected units, some systems employ means, such as an equalizer bus, for connecting the regulating means of each unit in parallel so that the phase of the grid excitation of all the units is varied in exactly the same manner in response to conditions of the load circuit.

However, it has been found that varying the phase of the grid voltage of each unit the same amount does not always produce equal load division between the units. One reason for this is that the individual characteristics of the units may vary from one to another.

Another disadvantage of the load balancing system suggested in the prior art is that all of the units that are to be connected in parallel must have equal ratings, and practically this is not always possible.

According to the present invention there is provided an improved system for insuring a predetermined load division between a plurality of parallel connected conversion units. This improved system comprises a plurality of conversion units which have their output circuits connected in parallel to a D. C. load circuit, and each conversion unit includes a plurality of electric valves of the mercury arc type which are provided with control members. The current transmittted by each unit is controlled by a regulating means which is provided with control means such as a control circuit. The control circuit includes a feedback element, a reference element, and means for supplying to the feedback element a current which is proportional to the current transmitted by the unit. Totalizing buses are provided for connecting the reference elements of all the control circuits in parallel and means are provided for supplying to the totalizing buses a current which is proportional to the total current supplied to said load circuit by all said units to cause the current in each reference element to be proportional to a predetermined percentage of the said total current. The amount of current in each reference element is dedetermined by the value of resistance in its parallel branch as compared to the total resistance of all the paralleled branches. For example, if the resistances of all branches are equal, the currents in the individual branches are equal, and the summation of these currents is always proportional to the total current transmitted to the load circuit.

In each regulator control circuit, the currents of the reference element and the feedback element act to cause the regulating means to control the current transmitted by that unit. Therefore, the current transmitted by each unit is controlled with respect to the total current transmitted by all the parallel connected units.

With this arrangement a number of units may be connected in parallel to supply energy to a load circuit in a predetermined manner, and the number of units may be increased or decreased without changing the relative division of a load between the original parallel connected units.

It is therefore an object of the present invention to provide an improved system for obtaining a predetermined load division between a plurality of electric current converters which are connected in parallel to supply power to a D. C. circuit.

Another object of the present invention is to provide an improved system for maintaining equal load division between a plurality of parallel connected converters.

A further object of the present invention is to provide in a conversion system having a plurality of mercury arc rectifier units adapted to be connected in parallel to a D. C. bus, an improved load balancing system for insuring equal load division between the units when they are connected in parallel.

A still further object of the present invention is to provide in an electric valve conversion system having a plurality of parallel connected rectifier units, which have their individual outputs regulated by a magnetic amplifier, an improved load balancing system including winding means on each magnetic amplifier to control the saturation thereof and thereby effect a predetermined load division between the units.

Objects and advantages other than those mentioned above will be apparent from the following description when read in connection with the drawing in which.

Figure 1:
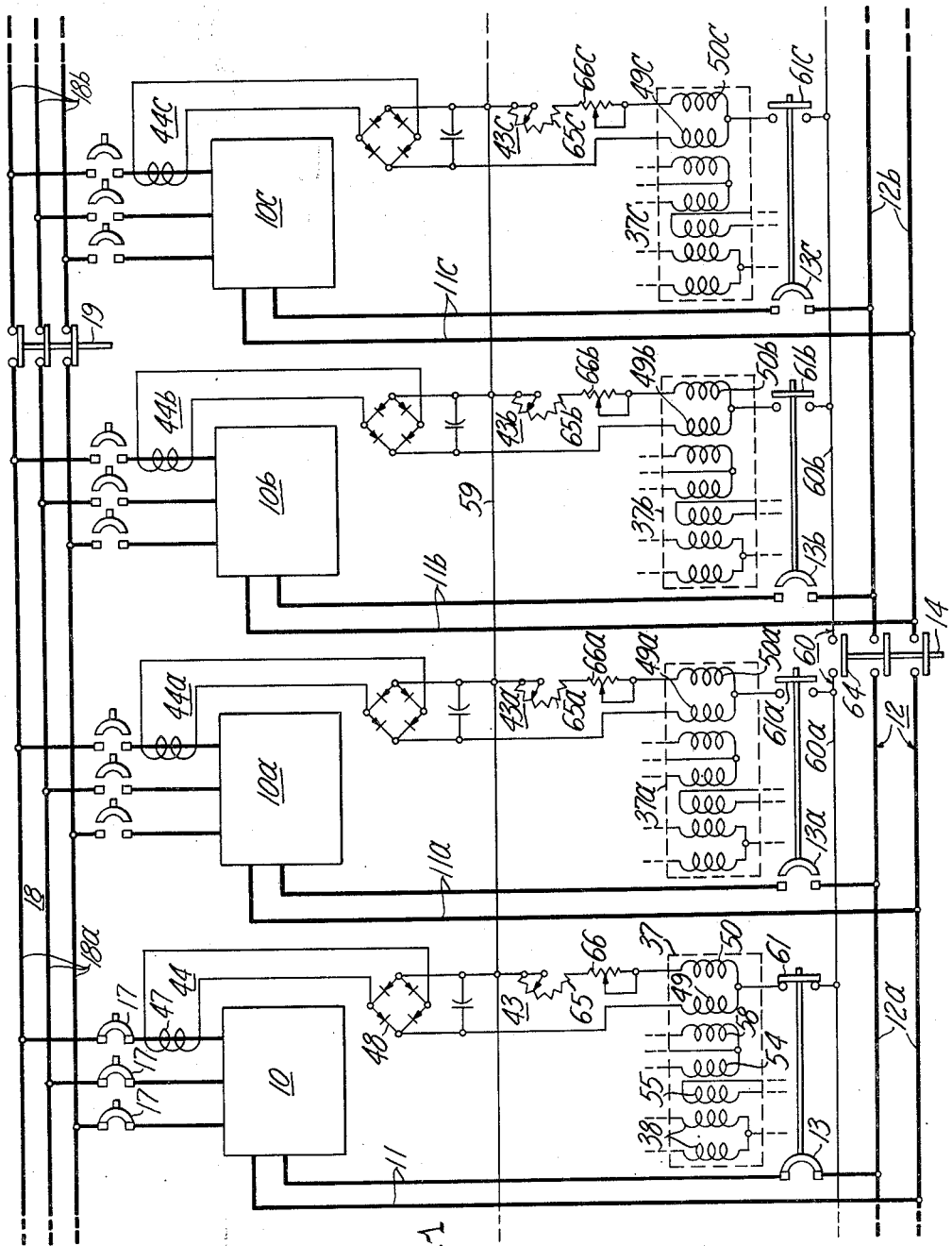
Fig. 1 illustrates diagrammatically the preferred embodiment of the improved load balancing system as applied to a plurality of parallel connected converters.

Referring to the drawings, the conversion system shown in Fig. 1 comprises a plurality of parallel connected rectifier units 10 which have their output circuits 11 connected in parallel to a D. C. load circuit 12 through circuit breakers 13. The load circuit includes two sections 12a and 12b which may be interconnected by a sectionalizing switch 14. As shown, units 10 are also connected in parallel to an A. C. supply circuit 18. Supply circuit 18 comprises sections 18a and 18b which may be connected together by switch 19. However, if desired each unit may be connected to a separate supply circuit.

Figure 2:
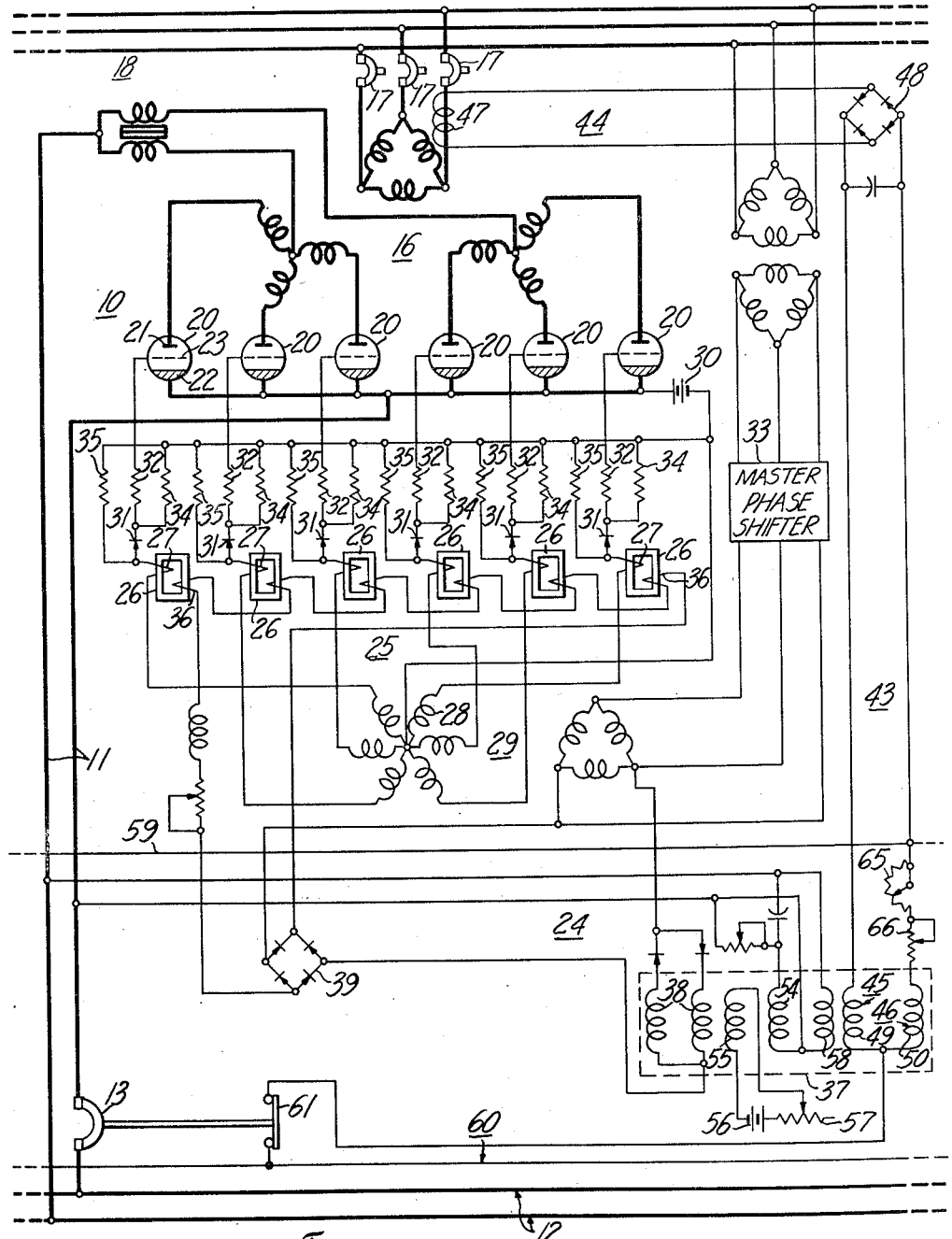
Fig. 2 is a schematic view of one of the units shown in Fig. 1.

Each of the rectifier units 10, 10a, 10b and 10c are identical and one is shown in detail in Fig. 2. Referring to Fig. 2, rectifier unit 10 comprises a plurality of electric valves 20 which are preferably of the type employing an ionizable medium and are provided with an anode 21, a cathode of the self-reconstructing type such as a mercury pool cathode 22, and a control member such as a grid 23. Transformer 16 is provided with secondary windings, which are connected to anodes 21 of valves 20, and with primary windings which are connected to the A. C. supply circuit 18 through A. C. breakers 17.

In order to control the power transmitted by the rectifier unit, it is provided with suitable regulating means 24 which comprises a phase control circuit, and a magnetic amplifier. In this instance phase control circuit 25 operates to change the time in each cycle at which firing voltage is applied to the grids with respect to the voltage applied to the anodes. As shown, phase control circuit 25 comprises a plurality of saturable reactors 26, each having a reactive winding 27 connected between a secondary winding 28 of the grid transformer 29 and a different one of the grids 23. The grids 23 are energized from the grid transformer 29 and as shown each grid 23 is biased negatively with respect to the cathode 22 by suitable means such as the battery 30. Reactive winding 27 is connected to grid 23 through a unidirectional current conducting device shown as a dry plate rectifier 31, and a resistor 32, which limits the current flow to grid 23. Dry plate rectifier 31 is connected so as to prevent the flow of negative grid current in reactive winding 27. A resistor 34 is connected between the grid 23 and the cathode 22 to provide a path for the flow of negative grid current. A loading resistor 35 is provided for each secondary phase winding 28 of transformer 29. The primary winding of grid transformer 29 is connected to supply circuit 18 through a master phase shifter 33 which is operable to shift the grid voltage substantially 180 degrees.

Each reactor is also provided with a D. C. control winding 36. The current in control winding 36 controls the direct current magnetization of the reactor which in turn determines the saturation point of the reactor. The voltage supplied to the grids 23 from the grid transformer changes abruptly at a point in the cycle at which the reactor becomes saturated. Increasing the magnetizing current advances the point in the cycle at which the grid voltage is abruptly changed to cause the valve 20 to start conducting at an early point, and reducing the magnetizing current retards the point in the cycle at which the grid voltage changes abruptly to cause the valve to start conducting at a later point. The control windings 36 of all the reactors are connected in series so that by increasing the magnetizing current in the serially connected control windings 36, the power transmitted to the load circuit 12 by unit 10 is increased, and by decreasing this current the energy is decreased.

The magnetizing current in control windings 36 of the reactors is obtained from a suitable source of alternating current voltage through a pair of main windings 38 on a magnetic amplifier 37 and through a bridge rectifier arrangement 39.

A control circuit 43 is provided for regulating means 24. Control circuit 43 comprises a feedback element 45, a reference element 46 and a means 44 for supplying to the feedback element 45 a current which is proportional to the current transmitted by the unit. Current supply means 44 comprises a current transformer 47 on the supply side of the rectifier unit 10 and a bridge connected rectifying arrangement 48. As shown reference element 46 is connected in circuit with feedback element 45 so that when the unit is operating individually the current in both elements is the same. However, other suitable current supply means may be used to obtain a current which is proportional to the current transmitted by the unit. In the preferred embodiment of the invention shown in Fig. 2, the feedback element 45 of the control circuit 43 comprises a feedback winding 49 on magnetic amplifier 37, and the reference element 46 comprises a reference winding 50 in circuit with feedback winding 49 but arranged on magnetic amplifier 37 so as to oppose the action on the magnetic amplifier of the feedback winding. The feedback winding and the reference winding have an equal number of turns.

If desired, other control windings may be provided on magnetic amplifier 37 to improve its operation. As shown, the magnetic amplifier is provided with a damper winding 54 which is connected across the output circuit 11 of the unit and is responsive to the rate of change of the D. C. voltage of that circuit. This winding therefore serves as a stabilizer for the magnetic amplifier. A voltage level winding 55 is also provided to set the voltage level of the unit. As shown, winding 55 is connected across a source of constant D. C. voltage such as a battery 56 through a variable resistor 57. A voltage control winding 58 is also provided. Winding 58 is connected across output circuit 11 and operates in cooperation with winding 55 to maintain the voltage of circuit 11 constant at a preselected level.

Referring again to Fig. 1, the reference windings 50 of all the control circuits 43 are connected in parallel by means of totalizing buses 59, 60. Totalizing buses 59 and 60 are connected to the different control circuits so that the current obtained from supply means 44 of all parallel connected units is totalized. These buses are provided with interlocks 61 which operate with actuation of the circuit breakers 13 to connect the reference windings in parallel through the totalizing buses 59, 60 when the units are connected to the load circuit. As shown, totalizing bus 60 is divided in two sections 60a and 60b which are connected together by an interlock 64 which operates with the sectionalizing switch 14 in the load circuit 12 when the two sections 12a and 12b of the load circuit 12 are connected together.

The current in each branch of the parallel arrangement formed by closing the interlocks, depends on the resistance of the branch with respect to the other branches. Means are provided in each branch to change the resistance thereof and as shown, this means comprises a rheostat 65 and a variable resistor 66 in series with the reference winding 50. If the resistances of all branches are equal, the currents in all branches are also equal. The summation of all the branch currents is proportional to the total current transmitted to the load circuit. However, the currents in each branch may be changed with respect to the total current in all the branches by movement of the rheostat.

The operation of the system is substantially as follows:

Assume that in the system shown in Fig. 1, the A. C. breakers 17 of all the units are closed and that unit 10 is transmitting energy between section 18a of the supply circuit and section 12a of the load circuit. Circuit breaker 13 and interlock 61 are closed, as shown, connecting output circuit 11 to section 12a, and reference winding 50 between totalizing buses 59 and 60a. Also assume that bias winding 55 is suitably adjusted to cause the voltage of output circuit 11 to be established at a predetermined voltage. Since the current in reference winding 50 and feedback winding 49 is the same and both windings have an equal number of turns, saturation of the magnetic amplifier 37 is not affected by these windings. The output of unit 10 is therefore controlled in response to the action of the other control windings.

For purposes of illustration, assume further that unit 10a is to be connected in parallel to section 12a of the load circuit and that units 10 and 10a are to share the load equally. Circuit breaker 13a closes connecting output circuit 11a to section 12a. Closing of circuit breaker 13a also closes interlock 61a connecting reference winding 50a between totalizing buses 59 and 60a and in parallel with reference winding 50. Rheostat 65a is adjusted until resistances of the parallel branches are equal, causing the current in each reference winding to be equal and proportional to one-half of the total current transmitted to section 12a of the load circuit.

If the units are sharing the load equally between them, the currents in reference windings 50 and 50a are equal to the currents in feedback windings 49 and 49a respectively. However, if one unit, for example 10a, is supplying more than its share of the load, the current in feedback winding 49a is more than the current in reference winding 50a. This difference in current acts to suitably change the saturation of magnetic amplifier 37a to cause the current transmitted by unit 10a to be reduced until the ampere turns of feedback winding 49a are substantially equal to the ampere turns of reference winding 50a. Unit 10a then supplies its share of load which under the assumed conditions is one-half. If desired voltage level winding 55a and voltage control winding 53a may be omitted from magnetic amplifier 37a without affecting the operation of the system, since only one unit may be used to set the voltage level of the system.

Units 10b and 10c may be connected in parallel between supply circuit 18 and section 12b of load circuit 12 in the same manner that units 10 and 10a are connected in parallel to section 12a. Units 10b and 10c may be suitably adjusted so that they each supply a proportionate share of the current to section 12b. These units operate substantially the same as units 10 and 10a.

Sections 12a and 12b of load circuit 12 may supply separate loads. However, if desired sectionalizing switch 14 may be closed to interconnect these two sections. Closing of switch 14 automatically closes interlock 64 connecting all the reference windings in parallel. If all the parallel branches have substantially equal resistances, each unit supplies its proportionate share of the load, which is one-fourth under the assumed conditions. The operation of the system with the four units connected in parallel to load circuit 12 is substantially the same as that described previously.

If for some reason one of the units, for example, unit 10c, is temporarily disconnected from the system by opening circuit breaker 13c and interlock 61c the remaining three units absorb the additional load put on them equally. In other words, units 10, 10a and 10b each supply one-third of the current required by load circuit 12 when unit 10c is disconnected.

Another advantage of the present system is that a unit which is connected to a different source of supply or a unit having a different rating, may be paralleled to the system without altering its opertion. Assume for purposes of illustration that unit 10c which was previously temporarily disconnected is connected to a separate source of supply. Switch 19 in supply circuit 18 is opened and section 18b is energized from a source of voltage different from the energizing source for section 18a. Unit 10c is connected in parallel with the other units by closing breaker 13c which automatically closes interlock 61c. The four parallel connected units operate substantially as previously described.

A further advantage of the present system is that one unit, by decreasing the resistance of its parallel branch containing the reference element, may be made to supply more than its proportionate share of the load. For example, assume that units 10, 10a and 10b are connected in parallel to load circuit 12 and each supplied one-third of the load current. Unit 10c may be connected to load circuit 12 and rheostat 65c suitably adjusted so that unit 10c supplies one-half of the total current supplied to load circuit 12. Units 10, 10a and 10b each supply one-sixth of the total current after unit 10c is connected. The relative division of load between the original parallel connected units 10, 10a and 10b remains unchanged, that is they each supply an equal amount of current. The operation of the system is unchanged.

Figure 3:
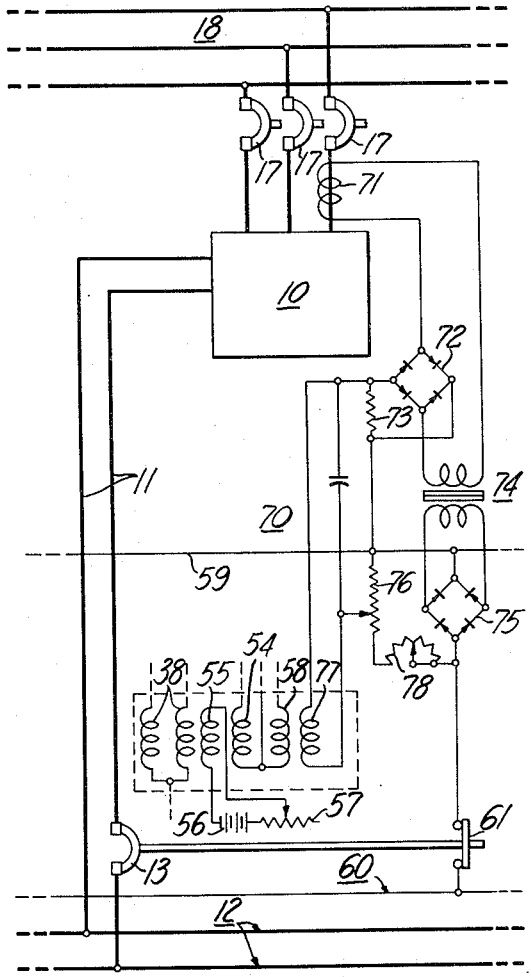
Fig. 3 shows a modification of the system shown in Fig. 1.

The rectifier unit shown in Fig. 3 is similar to that shown in Fig. 2, except for the control circuit 43 of the regulating means 24. Fig. 3 illustrates a modified control circuit designated generally by reference character 70. Control circuit 70 includes means for obtaining a current which is proportional to the current transmitted by the unit. This means includes a main current transformer 71, a rectifier bridge 72 which supplies current to a feedback element which comprises a resistor 73. The current supply means also includes an auxiliary current transformer 74, rectifier bridge 75, and a reference element which comprises a resistor 76. The current obtained from main current transformer 71 is supplied to feedback resistor 73, and the current obtained from auxiliary current transformer 74 is supplied to reference resistor 76. These currents cause a potential drop across resistors 73 and 76. The feedback resistor 73 and reference resistor 76 are connected in series with opposite polarities. A control winding 77 is connected across these series connected resistors so that if a difference in potential exists between these resistors caused by the current flow therein, a current flows in control winding 77. A rheostat 78 is provided in series with resistor 76 to vary the current therein. Reference resistor 76 is suitably adjusted before the unit is paralleled so that no current flows in control winding 77 when the unit is not paralleled. Control winding 77 therefore has no effect on the regulating means 24 when the unit is operating by itself. As in the system shown in Fig. 1 totalizing buses 59 and 60 are provided for totalizing the currents supplied to the reference resistors when the units are connected in parallel. When a unit is in parallel with another unit and the reference resistor 76 is in parallel with another reference element, any change in current through reference resistor 76 caused by the paralleling, changes the voltage of reference element 76 and thus causes a current to flow in control winding 77 which changes the saturation of magnetic amplifier 37. The operation of the system is then substantially identical as that described with relation to the system shown in Fig. 1.

Figure 4:
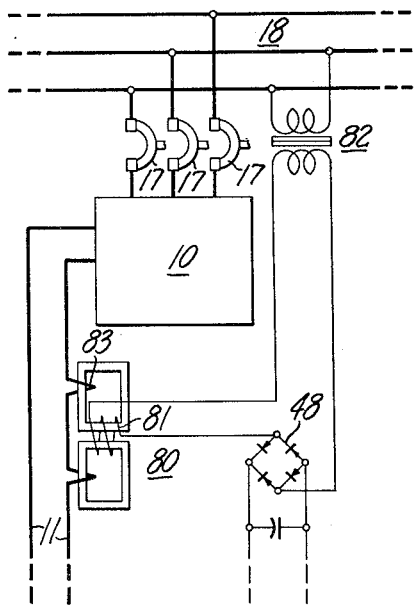
Fig. 4 shows a modification of the system shown in Figs. 1 and 3.

Instead of using a current transformer 47 as shown in Figs. 1 and 2 a transductor arrangement may be used in the output circuit 11 of the unit to provide a current for the control circuit of the regulator which is proportional to the current transmitted by the unit. This is shown in Fig. 4. The transductor arrangement comprises a saturable reactor device 80 having an alternating current winding 81 supplied with current from a source of alternating current voltage. As shown, this source of alternating current voltage comprises a potential transformer 82 connected to supply circuit 18. However, any suitable source of voltage may be used. A control winding 83 is connected in series with the output circuit 11 of the unit so that changes in current in the output circuit reflect a change in current in winding 81.

Figure 5:
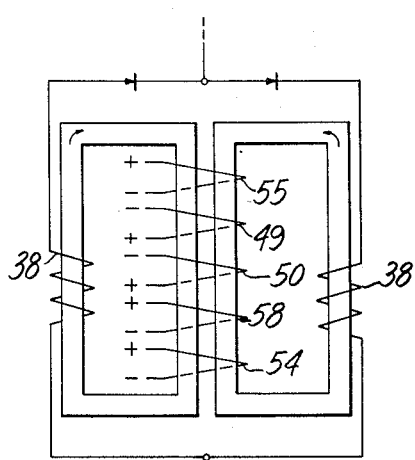
Fig. 5 shows the position of the various windings of the magnetic amplifier shown in Figs. 1 and 2.
Figure 6:
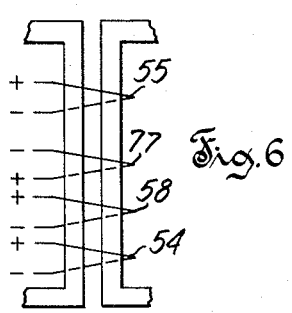
Fig. 6 is similar to Fig. 5 and illustrates the positioning of the windings of the magnetic amplifier shown in Fig. 3.

In Fig. 5 the arrangement of the various windings on the coil of the magnetic amplifier 37 is illustrated and Fig. 6 illustrates how the winding arrangement shown in Fig. 5 is modified for the modified control circuit shown in Fig. 9.

Although but a few embodiments of the present invention have been illustrated and described it will be apparent to those skilled in the art that various other modifications may be made without departing from the scope of the invention or from the spirit of the appended claims.

It is claimed and desired to secure by Letters Patent:

1. An electric current conversion system having a supply circuit, a load circuit, a plurality of electric valve conversion units connected in parallel between said circuits for transmitting energy therebetween, regulating means for each said unit for controlling the current transmitted to said load circuit by said unit, control means for each said regulating means comprising a feedback element, a reference element, and means for supplying to said feedback element a current proportional to the current transmitted to said load circuit by said unit; means for connecting said reference elements of all said control means in parallel comprising totalizing buses, and means for supplying to said totalizing buses a current proportional to the total current supplied to said load circuit by all said units to cause the current in each said reference element to be proportional to a predetermined percentage of said total current, each said regulating means being operable to control the current transmitted by its unit in response to the currents in said feedback element and said reference element of said each said regulator means.

2. An electric current conversion system having a supply circuit, a load circuit, a plurality of electric valve conversion units, adapted to be connected in parallel to said load circuit for transmitting energy between said supply circuit and said load circuit, first connecting means for each said unit operable to connect said unit to said load circuit, regulating means for each said unit for controlling the current transmitted to said load circuit by said unit, control means for each said regulating means comprising a feedback element, a reference element, and means for supplying to said feedback element a current proportional to the current transmitted to said load circuit by said unit; a totalizing bus, means for supplying to said totalizing bus a current proportional to the total current supplied to said load circuit by all said parallel connected units, second connecting means for each said control means operable with said first connecting means to connect one of said reference elements to said totalizing bus to cause the current in said one of said reference elements to be proportional to a predetermined percentage of said total current, each said regulating means being operable to control the current transmitted by its unit in response to the currents in said feedback element and said reference element of said each said regulator means.

3. An electric current conversion system comprising a plurality of sections each having a supply circuit, a load circuit, a plurality of electric valve conversion units connected in parallel between said circuits for transmitting energy therebetween, first connecting means for each said unit operable to connect said unit to said load circuit, regulating means for each said unit for controlling the current transmitted to said load circuit by said unit, control means for said regulating means comprising a feedback element, a reference element, and means for supplying to said feedback element a current proportional to the current transmitted to said load circuit by said unit; a totalizing bus, and means for supplying to said totalizing bus a current proportional to the total current supplied to said load circuit by all said parallel connected units, second connecting means for each said control means operable with said first connecting means to connect one of said reference elements to said totalizing bus, to cause the current in said one of said reference elements to be proportional to a predetermined percentage of said total current, and means operable to connect said load circuit and said totalizing bus of one of said sections respectively to said load circuit and said totalizing bus of another of said sections, each said regulating means being operable to control the current transmitted by its unit in response to the currents in said feedback element and said reference element of said each said regulator means.

4. An electric current conversion system having a supply circuit, a load circuit, a plurality of electric valve conversion units connected in parallel between said circuits for transmitting energy therebetween, regulating means for each said unit for controlling the current transmitted to said load circuit by said unit, control means for each said regulating means comprising a feedback element, a reference element, and means for supplying to each of said elements a current proportional to the current transmitted to said load circuit by said unit; means for connecting said reference elements of all said control means in parallel to cause the current in each said reference element to be proportional to a predetermined percentage of the total current transmitted to said load circuit by all said units, each said regulating means being operable to control the current transmitted by its unit in response to the currents in said feedback element and said reference element of said each said regulator means.

5. An electric current conversion system having a supply circuit, a load circuit, a plurality of electric valve conversion units connected in parallel between said circuits for transmitting energy therebetween, regulating means for each said unit for controlling the current transmitted to said load circuit by said unit; a control circuit for each said regulating means comprising a feedback element, a reference element in circuit with said feedback element, and means for supplying to said elements a current proportional to the current transmitted to said load circuit by said unit; means for connecting said reference elements of all said control circuits in parallel to cause the current in each said reference element to be proportional to a predetermined percentage of the total current transmitted to said load circuit by all said units; each said regulator means being operable to control the current transmitted by its respective unit in response to the difference in current in the said feedback element and said reference element of said each said regulator means.

6. An electric current conversion system having a supply circuit, a load circuit, a plurality of electric valve conversion units connected in parallel between said circuits for transmitting energy therebetween, a regulator for each of said units for controlling the current transmitted to said load circuit by said unit, a control circuit for each said regulator comprising a feedback winding, a reference winding in circuit with said feedback winding, and means for supplying a current to said windings which is proportional to the current transmitted by said unit, means for connecting said reference windings of all said control circuits in parallel to cause the current in each said reference winding to be proportional to a predetermined percentage of the total current transmitted to said load circuit by all said units, each said regulator being operable to control the current transmitted by its respective unit in response to the difference in current in said feedback winding and said reference winding.

7. An electric current conversion system having a supply circuit, a load circuit, a plurality of electric valve conversion units connected in parallel between said circuits for transmitting energy therebetween, a regulator for each of said units for controlling the current transmitted to said load circuit by said unit, a control circuit for each of said units comprising a feedback resistor, a reference resistor in circuit with said feedback resistor, and means for supplying to said resistors a current proportional to the current transmitted by said unit, means for connecting said reference resistors of said control circuits in parallel to cause the current in each said reference resistor to be proportional to a predetermined percentage of the total current transmitted to said load circuit by all said units; each said regulator being operable to control the current transmitted by its respective unit in response to the difference in current in said feedback resistor and said reference resistor.

8. An electric current conversion system having a supply circuit, a load circuit, a plurality of electric valve conversion units connected in parallel between said circuits for transmitting energy therebetween, a regulator for each of said units for controlling the current transmitted to said load circuit by said unit, a control circuit for each said regulator comprising a feedback winding, a reference winding in circuit with said feedback winding, a current transformer in circuit with a rectifying bridge arrangement for supplying a unidirectional current to said windings which is proportional to the current transmitted by said unit, means for connecting said reference windings of all said control circuits in parallel to cause the current in each said reference element to be proportional to a predetermined percentage of the total current transmitted to said load circuit by all said units, each said regulator being operable to control the current transmitted by its respective unit in response to the difference in current in said feedback winding and said reference winding.

9. An electric current conversion system comprising a plurality of electric valve conversion units having their input circuits connected to a supply circuit and their output circuits connected in parallel to a load circuit for transmitting energy between said circuits; a regulator for each of said units for controlling the current transmitted to said load circuit by said unit; a control circuit for each said regulator comprising a feedback winding, a reference winding in circuit with said feedback winding, and means for supplying a current to said feedback winding and said reference winding which is proportional to the current transmitted by said unit, said current supply means including a saturable reactor device having a first winding in circuit with said output circuit, a second winding, a rectifying bridge arrangement, and a potential transformer connected in series with said second winding and across said rectifying bridge; means for connecting said reference windings of all said control circuits in parallel to cause the current in each said reference winding to be proportional to a predetermined percentage of the total current transmitted to said load circuit by all said units; each said regulator being operable to control the current transmitted by its respective unit in response to the difference in current in said feedback winding and said reference winding.

10. An electric current conversion system having a supply circuit, a load circuit, a plurality of electric valve conversion units connected in parallel between said circuits for transmitting energy therebetween; each of said units comprising a plurality of electric valves provided with control members, transformer means for energizing said control members with a periodic potential to render said valves conductive; a regulator for each said unit for controlling the current transmitted to said load circuit by said unit, said regulator comprising a phase control circuit and a magnetic amplifier for varying the time at which said periodic potential renders said valves conductive; a control circuit for each said regulator comprising a feedback winding, a reference winding in circuit with said feedback winding, means for supplying to said windings a current proportional to the current transmitted to said load circuit by said unit, and rheostat means in circuit with said reference winding to vary the current in said reference winding; totalizing buses for connecting said reference windings of all said control circuits in parallel to cause the current in each said reference winding to be proportional to a predetermined percentage of the total current transmitted to said load circuit by all said units, whereby the difference in current in the said feedback winding and said reference winding of each control circuit operates to vary the saturation of said magnetic amplifier to control the current transmitted by said each said unit.

11. An electric current conversion system having a supply circuit, a load circuit, a plurality of electric valve conversion units connected in parallel between said circuits for transmitting energy therebetween; a regulator for each of said units for controlling the current transmitted to said load circuit by said unit, said regulator comprising a phase control circuit and a magnetic amplifier having a core, and a plurality of control windings disposed on said core, said control windings being operable to maintain the output voltage of said unit at a preselected value; a control circuit for each said regulator comprising a feedback winding disposed on said core, a reference winding disposed on said core and connected in circuit with said feedback winding, means for supplying a current to said feedback winding and said reference winding which is proportional to the current transmitted by said unit, and rheostat means in circuit with said reference winding to vary the current in said reference winding; means for connecting said reference windings of all said control circuits in parallel to cause the current in each said reference winding to be proportional to a predetermined percentage of the total current transmitted to said load circuit by all said units, whereby the difference in current in said feedback winding and said reference winding of each said control circuit operates to vary the saturation of said magnetic amplifier to cause each said unit to supply to said load circuit said predetermined percentage of the total current supplied to said load circuit by all said units.

12. An electric current conversion system comprising an alternating current supply circuit, a direct current load circuit, and a plurality of electric valve conversion units adapted to be connected in parallel between said circuits for transmitting energy therebetween; each of said units comprising a plurality of electric valves each provided with an anode, a cathode and a control member, first transformer means for connecting said valves to said supply circuit, second transformer means connected between said supply circuit and said control members for energizing said control members with a periodic potential to render said valves conductive, circuit breaker means including interlock means for connecting said unit to said load circuit; and regulating means for controlling the current transmitted to said load circuit by said unit, said regulating means comprising a phase control circuit and a magnetic amplifier for controlling the time at which said periodic potential renders said valves conductive, said magnetic amplifier comprising a core, a pair of main windings, a plurality of control windings; a control circuit for varying the effective impedance of said main windings by varying the saturation of said magnetic amplifier, said control circuit comprising a feedback winding disposed on said core, a reference winding disposed on said core and connected in circuit with said feedback winding, third transformer means for supplying to said feedback winding and said reference winding a current which is proportional to the current transmitted by said unit, and rheostat means in circuit with said reference winding for varying the current in said reference winding; and connecting means for connecting said reference windings of all said control circuits in parallel to cause the current in each said reference winding to be proportional to a predetermined percentage of the total current transmitted to said load circuit by all said units, said connecting means including totalizing buses and said interlock means of each said unit; each said regulator being operable in response to the difference in current in its said feedback winding and its said reference winding to cause the respective unit to supply to said load circuit said predetermined percentage of the total current supplied to said load circuit.

References Cited in the file of this patent
UNITED STATES PATENTS

| | | |
|---|---|---|
| 2,107,263 | Winograd | Feb. 1, 1938 |
| 2,246,173 | Herskind | June 17, 1941 |
| 2,288,016 | Myers | June 30, 1942 |